United States Patent [19]

Kunigami

[11] Patent Number: 5,508,817
[45] Date of Patent: Apr. 16, 1996

[54] ELECTRONIC MAIL ACCOUNTING SYSTEM

[75] Inventor: Toshio Kunigami, Kawasaki, Japan

[73] Assignee: Fujitsu Limited, Kanagawa, Japan

[21] Appl. No.: 34,513

[22] Filed: Mar. 19, 1993

[30] Foreign Application Priority Data

Mar. 19, 1992 [JP] Japan ................................. 4-063670

[51] Int. Cl.$^6$ ............................. H04N 1/00; G06F 15/00
[52] U.S. Cl. ........................... 358/402; 358/400; 358/407; 364/406
[58] Field of Search ...................................... 358/400, 402, 358/403, 407, 401, 442; 379/100, 93; 364/401, 406, 408, 514, 518, 900, 919.5, 937, 940.9

[56] References Cited

U.S. PATENT DOCUMENTS

| 4,994,926 | 2/1991 | Gordon et al. ........................... 358/400 |
| 5,040,141 | 8/1991 | Yazima et al. ........................... 364/900 |
| 5,046,189 | 9/1991 | Kainuma ................................. 379/100 |

Primary Examiner—Edward L. Coles, Sr.
Assistant Examiner—Allan A. Esposo

[57] ABSTRACT

When sending electronic mail, a sender designates the payer of the communications fee for the transmission between an electronic mail center and a receiver, that is, the sender or the receiver. When the receiver accesses the electronic mail center, the electronic mail center notifies as the mail summary information for each mail the payer of the fee for the communication between the electronic mail center and the receiver. The fee payer information is displayed on the terminal of the receiver. When the receiver receives from the electronic mail center the electronic mail addressed to him, the electronic mail center generates a bill according to the fee required for the delivery of the electronic mail separately for senders and receivers. In this case, the communications fee for the transmission between the electronic mail center and the receiver is charged to the payer designated by the sender when the electronic mail is sent.

13 Claims, 11 Drawing Sheets

FIG. 9

BILLING DATA STORAGE AREA

Electronic Mail "1":

| Field | Value |
|---|---|
| SENDER ID | AAA123 |
| MAIL SERIAL NUMBER | 24 |
| RECEIVER ID | BBB456 |
| FEE PAYER IDENTIFIER | 0 |
| TRANSMISSION START TIME | 920109 09:21:15 |
| TRANSMISSION TERMINATION TIME | 920109 09:21:35 |
| TIME REQUIRED FOR TRANSMISSION | 0:20 |

Electronic Mail "2":

| Field | Value |
|---|---|
| SENDER ID | XXX983 |
| MAIL SERIAL NUMBER | 15 |
| RECEIVER ID | BBB456 |
| FEE PAYER IDENTIFIER | 0 |
| TRANSMISSION START TIME | 92:01:09 09:21:55 |
| TRANSMISSION TERMINATION TIME | 92:01:09 09:22:23 |
| TIME REQUIRED FOR TRANSMISSION | 0:28 |

FIG.11A

BILLING DATA FOR CHARGING SENDER HAVING SENDER ID = AAA123 FOR DELIVERY OF ELECTRONIC MAIL No.24

| No.24 | BBB456 | 92-01-09 | 09:21:35 | 0:20 | ¥10 |

RECEIVER ID

FIG.11B

BILLING DATA FOR CHARGING SENDER HAVING SENDER ID = XXX983 FOR DELIVERY OF ELECTRONIC MAIL No.15

| No.15 | BBB456 | 92-01-09 | 09:22:23 | 0:28 | ¥10 |

RECEIVER ID

FIG.11C

BILLING DATA FOR CHARGING SENDER HAVING SENDER ID = BBB456 FOR ELECTRONIC MAIL AAA123 No.24 AND XXX983 No.15

| No.24 | AAA123 | 92-01-09 | 09:21:35 | -0:20 | -¥10 |
| No.15 | XXX983 | 92-01-09 | 09:22:23 | -0:28 | -¥10 |

MAIL SERIAL NUMBER FOR EACH SENDER / SENDER ID / MAIL TRANSMISSION DATE AND TIME / MAIL TRANSMISSION TERMINATION TIME / REQUIRD TIME (x)(MINUTE/SECOND) / AMOUNT (x) IN CASE OF ¥10 PER MINUTE x - (MINUS) MEANS SENDER IS PAYER 5,508,817

ELECTRONIC MAIL ACCOUNTING SYSTEM

BACKGROUND OF THE INVENTION

1. Field of the Invention

The present invention relates to an electronic mail accounting system.

2. Description of the Prior Art

There is the increasing world-wide use of electronic mail systems as communications devices. The electronic mail system of the present invention has the functions of various types of electronic mail such as text mail, facsimile mail, voice mail, etc. through an electronic post office box called a "mail box" including communications through personal computers.

FIG. 1 shows the configuration of an electronic mail system. When electronic mail 12 is sent through the communications over personal computers, the electronic mail 12 sent by a sender 1 through his terminal 1a via a communications line 10 is stored in a storage unit (mail box) 11 in a personal communications center (electronic mail center) 2. If a receiver 3 specified as a destination of the electronic mail finds the electronic mail 12 addressed to him when he accesses the center 2 through his terminal 3a, he receives the electronic mail 12 by his terminal 3a via the communications line 10.

In the accounting method of the conventional electronic mail, the communications fee for the electronic mail 12 from the sender 1 to the center 2 is born by the sender, while the communications fee for the electronic mail 12 from the center 2 to the receiver 3 is normally born by the receiver 3.

However, if the communications fee for the electronic mail 12 from the center 2 to the receiver 3 is born by the receiver 3, there is the problem that the receiver 3 is subject to disadvantage because the fee is born by a sender on a total end-to-end basis in the accounting method of other normal communications systems.

SUMMARY OF THE INVENTION

The present invention relates to an electronic mail system for storing in an electronic mail center electronic mail sent by a sender, and sending the electronic mail from the electronic mail center to a receiver when the receiver requests the stored electronic mail to be delivered by him. With this system, the present invention aims at providing an electronic mail system capable of charging a sender a total end-to-end communications fee for the electronic mail.

The electronic mail system according to the present invention comprises a fee payer designating unit operated by a sender for designating which is to pay the fee for the electronic mail, the sender or the receiver, for the delivery between an electronic mail center and the receiver.

The electronic mail system further comprises a mail summary information sending unit for sending the information about the payer of the reception fee for the electronic mail in addition to sender information when the reception of electronic mail addressed to the receiver is inquired by the receiver.

Furthermore, the electronic mail system comprises a billing unit for charging a sender a reception fee if the sender is designated as the reception fee payer of electronic mail according to the fee payer designating unit operated by a sender, while charging the receiver for it if the receiver is designated as the reception fee payer.

The electronic mail system additionally comprises a mail summary displaying unit operated by a receiver for displaying the information about the electronic mail addressed to him and sent by the mail summary information sending unit.

Furthermore, the electronic mail system comprises an electronic mail delivery designating unit operated by a receiver for designating the delivery of electronic mail among the mail addressed to him and displayed on the mail summary displaying unit.

When a sender sends electronic mail, he designates the receiver, the contents of the mail, and the payer (sender or receiver) of the fee for sending the mail from the electronic mail center to the receiver through the fee payer designating unit, and then sends the mail to the electronic mail center.

The electronic mail center receives the above described information designated through the fee payer designating unit, and stores it in addition to the information about the sender's name, receiver's name, and the contents of the mail, etc. Then, in response to the inquiry from the receiver, the center notifies the receiver of the reception of the mail at the electronic mail center.

On receiving the notification of the mail addressed to the receiver and received by the electronic mail center, the receiver accesses the electronic mail center.

In response to the access from the receiver, the mail summary information sending unit at the electronic mail center sends to the receiver the information about the summary of the mail received by the electronic mail center and stored therein, that is, the sender's name, fee payer, etc.

The entire information is displayed on the mail summary displaying unit.

The receiver refers to the summary of the mail received by the electronic mail center and displayed on the mail summary displaying unit, designates through an accepted electronic mail designating unit the accepted mail, and informs the electronic mail center of the accepted mail.

The electronic mail center sends to the receiver the electronic mail designated by the accepted electronic mail designating unit.

Then, the electronic mail system activates a billing unit, and charges the receiver the communications fee from the electronic mail center to the receiver if the receiver is designated as the payer by the fee payer designating unit, while it charges the sender if he is designated as the payer.

BRIEF DESCRIPTION OF THE DRAWINGS

One skilled in the art can easily understand additional features and objects of this invention from the description of the preferred embodiments and some of the attached drawings. In the drawings:

FIG. 9 shows the operation data used when an electronic mail center bills for communications fee for electronic mail;

FIGS. 11A, 11B and 11C show the method of preparing bills for a sender and a receiver.

DESCRIPTION OF THE PREFERRED EMBODIMENT

Figure 1:
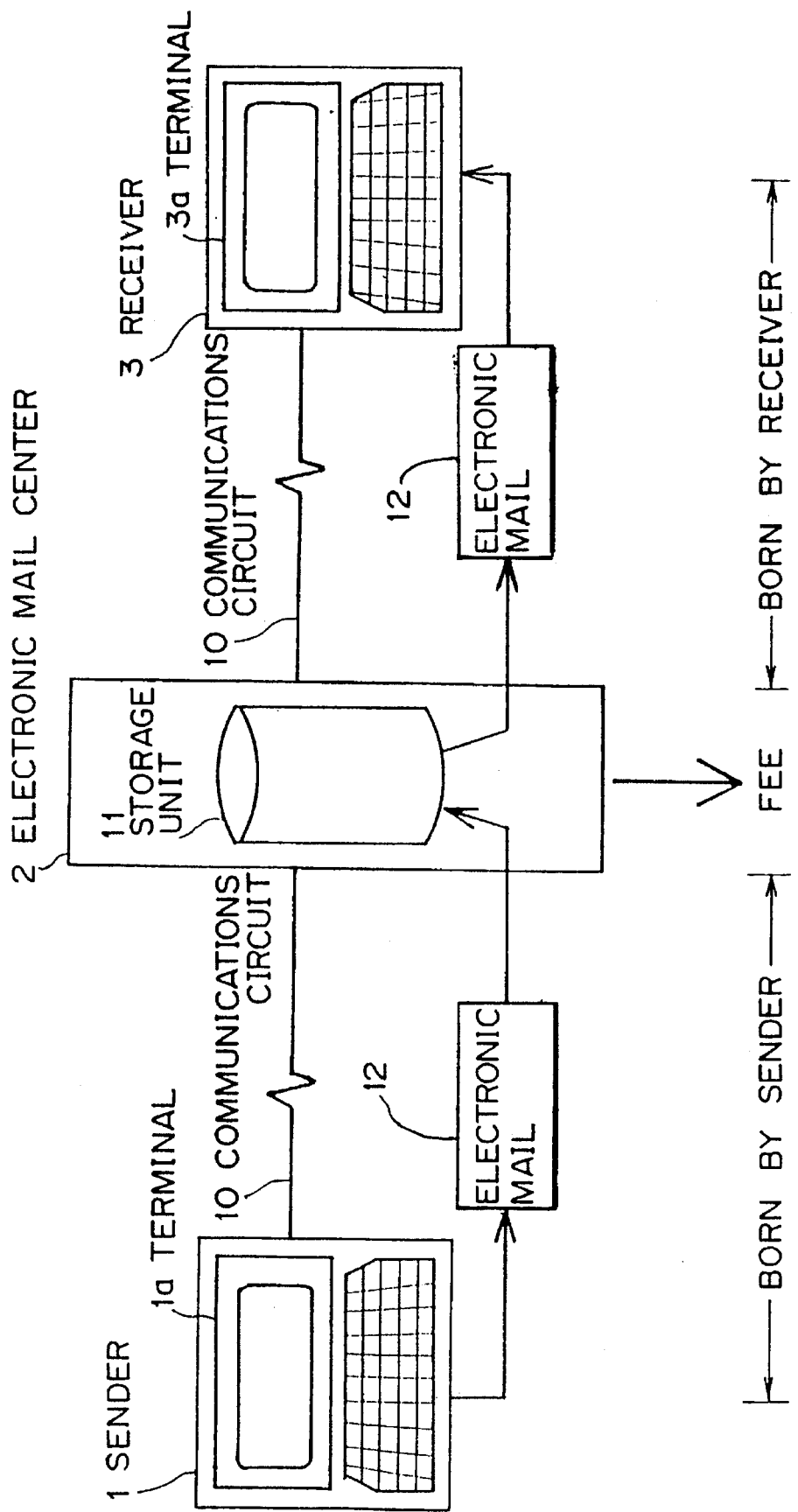
FIG. 1 shows the configuration of the conventional electronic mail system.
Figure 2:
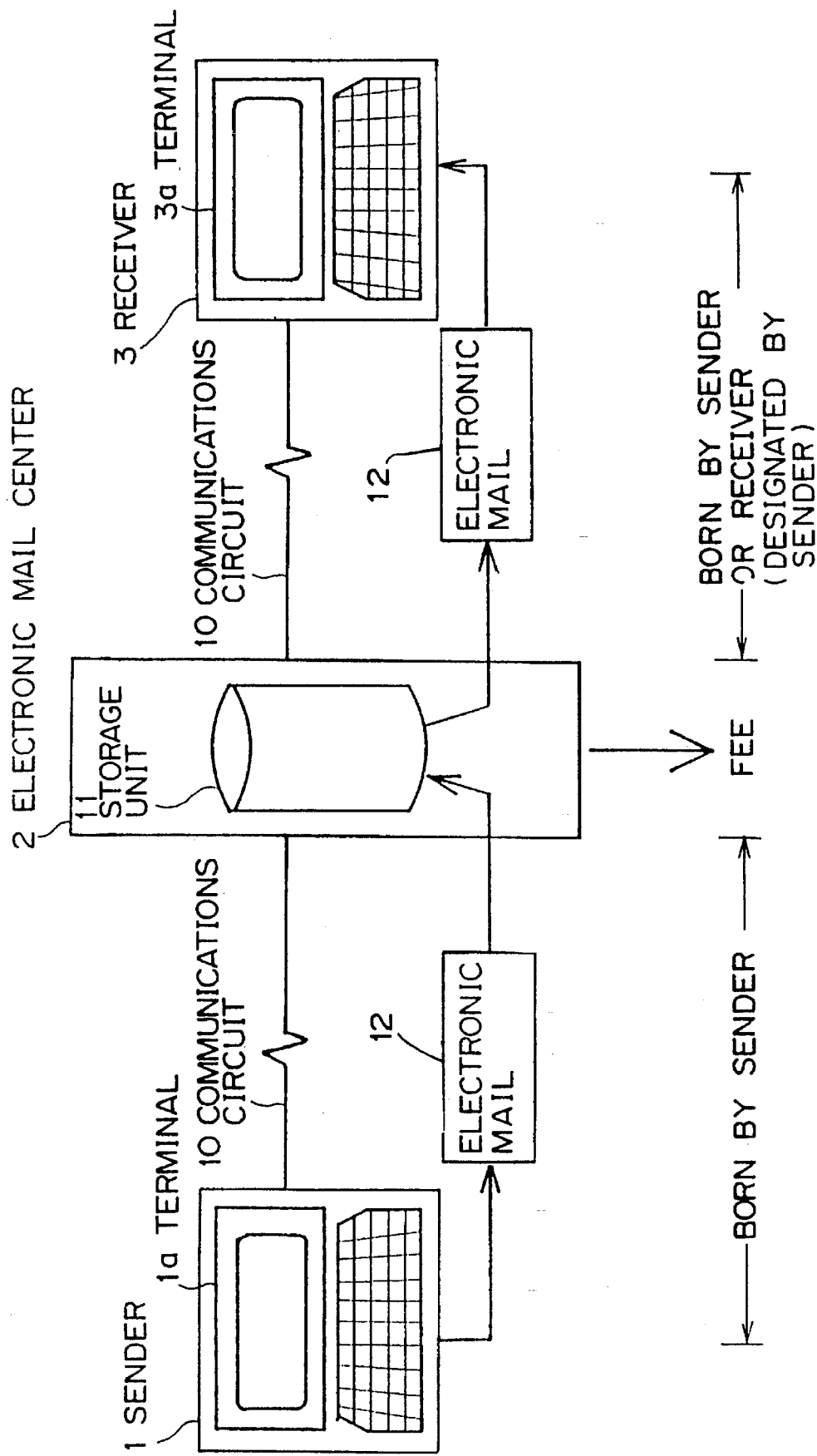
FIG. 2 shows the system configuration of an embodiment of the present invention.

The preferred embodiment of the present invention is explained below. As shown in FIG. 2, the electronic mail system according to the present invention can be realized with the system configuration similar to that of the conventional method shown in FIG. 1. That is, it comprises a workstation having an external storage unit as a mailbox, an electronic mail center having computers such as minicomputers, and a plurality of computers such as personal computers, etc. connected to the electronic mail center via a communications line.

As shown in FIG. 2 in the present embodiment, the fee for receiving electronic mail is to be born either by a receiver or a sender according to the sender's designation, not limited to a sender as in the conventional method.

Next, the practical method of realizing the above described accounting process is explained furthermore in detail by referring to the attached drawings.

Figure 3:
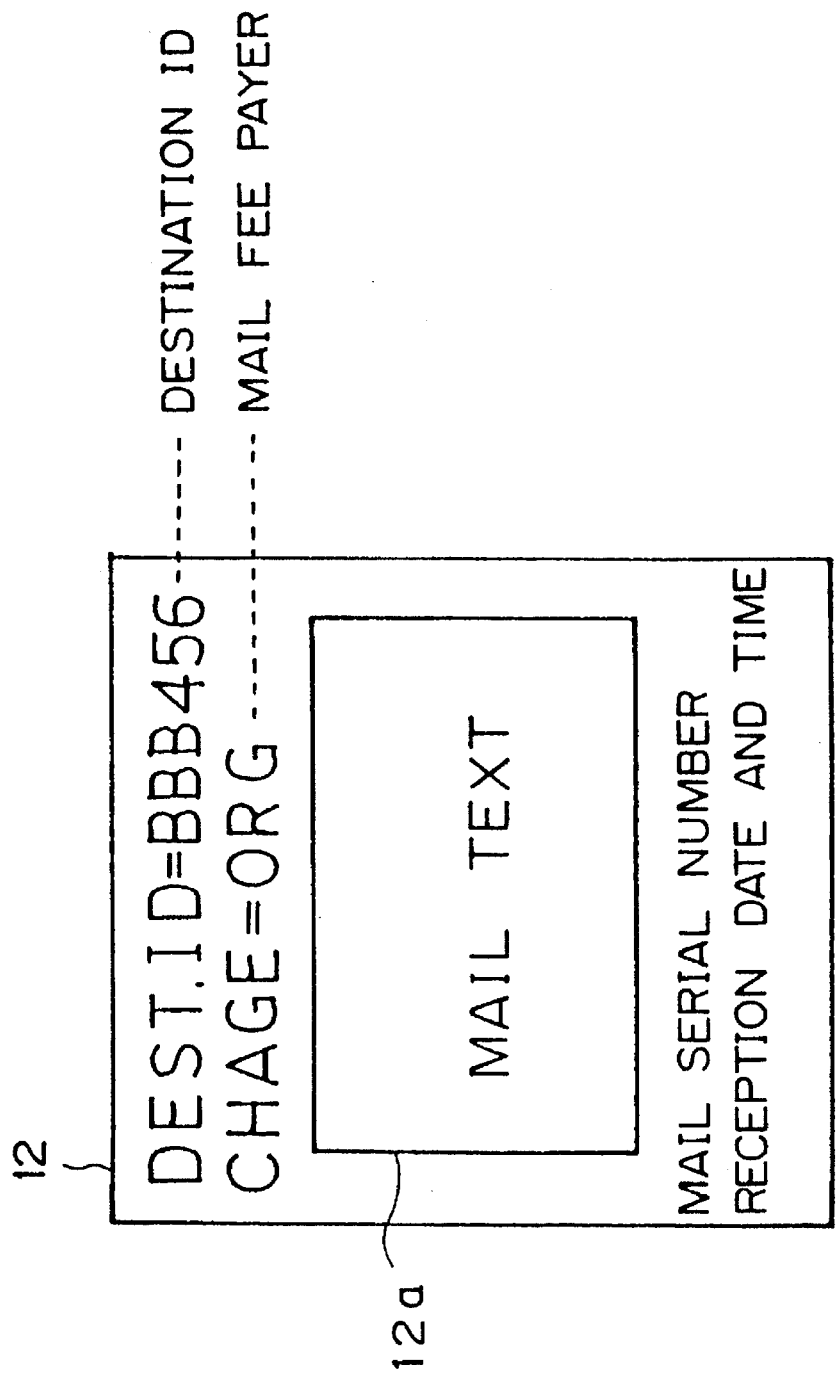
FIG. 3 shows the procedure of sending electronic mail from a sender to an electronic mail center.

FIG. 3 shows an embodiment of the format of the mail 12 sent by a sender.

When the sender 1 sends the electronic mail 12 from his own terminal 1a, he inputs a destination ID (DEST.ID= BBB456) followed by the text 12a of the electronic mail 12 as in the conventional method. Then, in the present invention, inputted is a parameter for designating a charge payer (CHARGE). That is, if the charge is born by the receiver, "CHARGE=DEST" is set.

The above described "charge" means the charge for using a mail system, and does not include the charge for using, for example, NTT's communications line.

After the setting described above, the text 12a of the electronic mail 12 is inputted. If thus prepared electronic mail 12 is sent to the electronic mail center 2, then the electronic mail center 2 returns to the sender's terminal 1a the mail serial number individually assigned for each sender, and the reception time of the electronic mail 12 received at the electronic mail center 2.

Figure 4A:
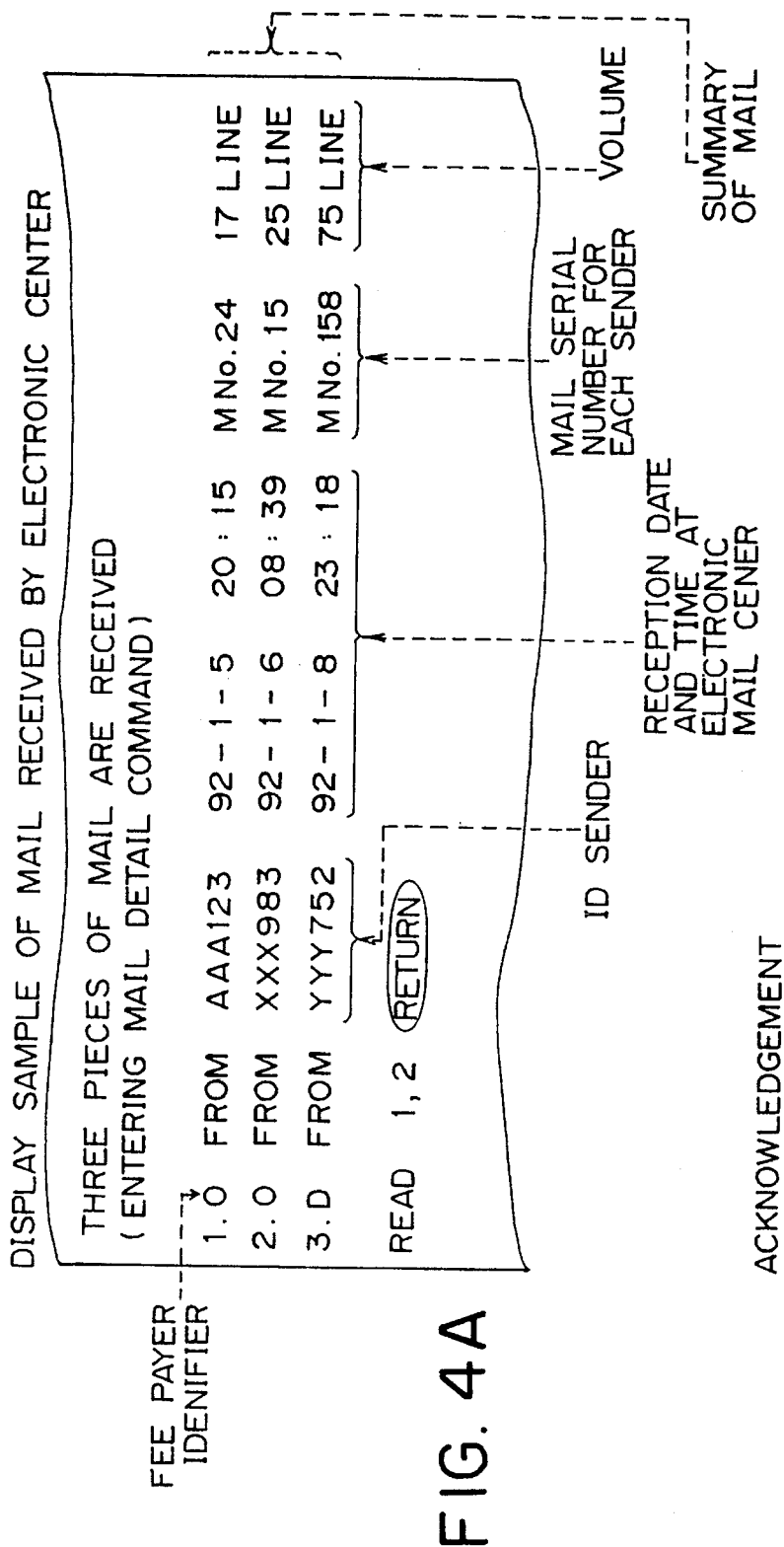
FIGS. 4A and 4B show a display sample of a receiver's terminal used when the receiver inquires of an electronic mail center about received mail.
Figure 4B:
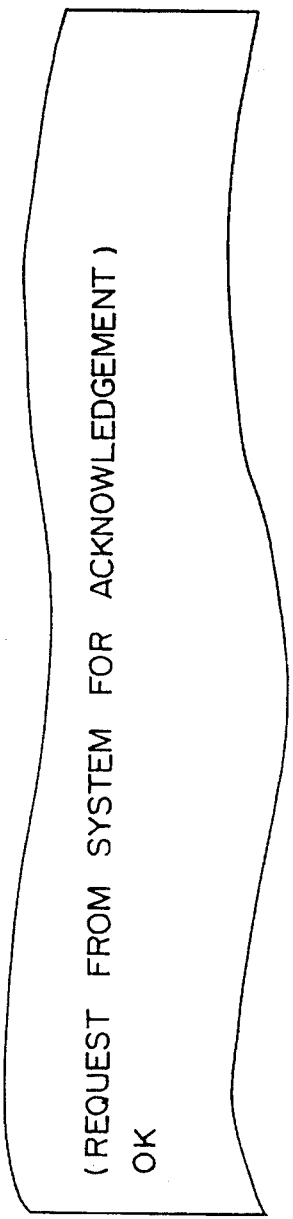

Next, FIGS. 4A and 4B show the display format on the terminal 1a used when the receiver 3 inquires of the center about received mail (the electronic mail 12 addressed to the receiver 3).

If the receiver 3 inquires through his terminal 3a of the electronic mail system 2 about mail, the electronic mail system 2 sends the above described inquiry information, then a message, etc. notifying whether or not the mail addressed to the receiver is received by the electronic mail center is displayed on the receiver's terminal (FIG. 4A) when the electronic mail 12 is received by the electronic mail center 2, or when the receiver 3 operates the terminal 3a. The example shown in FIG. 4a displays the message notifying that three pieces of mail are received by the electronic mail center. At this message, the receiver 3 enters through his terminal 3a a command to display the summary of the mail (mail detail command) received by the electronic mail center. The command is transmitted from terminal 3a to the electronic mail center 2, the electronic mail center 2 answers it with the summary of the received mail, and terminal 3a displays this information.

FIG. 4A shows an example of the display on terminal 3a displayed when the receiver inquires of the center about the mail received by the center.

In this case, the summaries of three pieces of received mail received by the electronic mail center are displayed. The serial numbers in the leftmost column show identification numbers of the mail received by the electronic mail center. To the right of each number, displayed is a fee payer identifier. That is, O indicates a sender, and D indicates a receiver. Furthermore, displayed are other items in a summary such as a sender ID, the reception date of the electronic mail received by the electronic mail center, serial number of mail individually assigned for each sender, and the volume of mail (number of lines in this case) received by the electronic mail center.

At the summary of the mail received by the electronic mail center, the receiver 3 selects the electronic mail 12 to be delivered to him. In this case, the sender selects mail number 1 and 2 of the electronic mail 12 (READ 1, 2) whose communications fees are born by the sender. The electronic mail system 2 sends to the receiver 3 mail number 1 and 2 of the electronic mail 12 according to the designation.

After sending the designated mail, the electronic mail system 2 sends to terminal 3a of the sender 3 a request for the acknowledgement of the designated electronic mail (FIG. 4B). The receiver 3 returns an acknowledgement signal (OK) from terminal 3a to the system if the designated mail is correctly received.

Figure 5A:
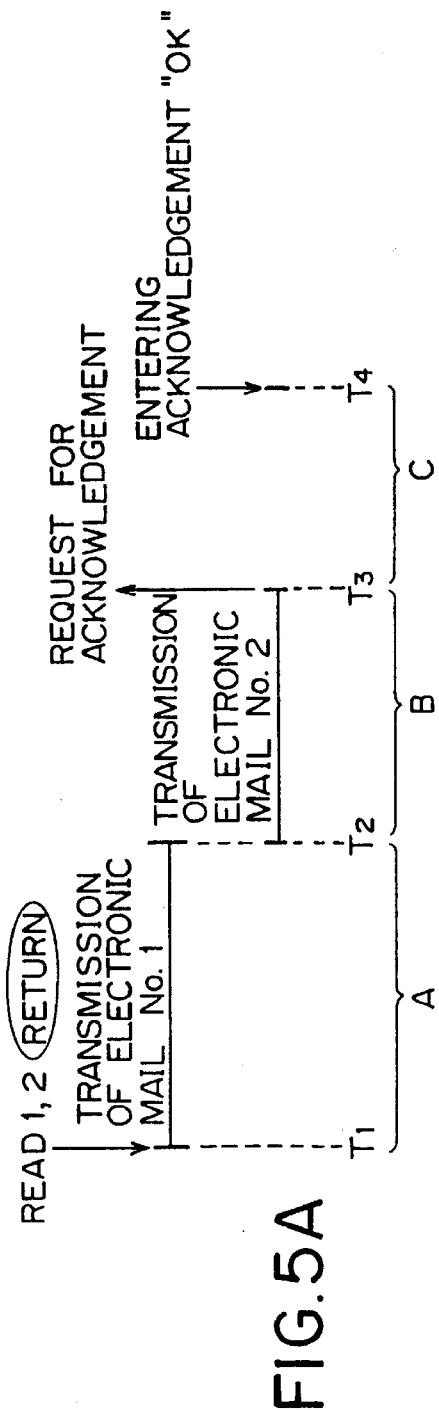
FIGS. 5A and 5B show the method of counting the fee for receiving electronic mail.
Figure 5B:
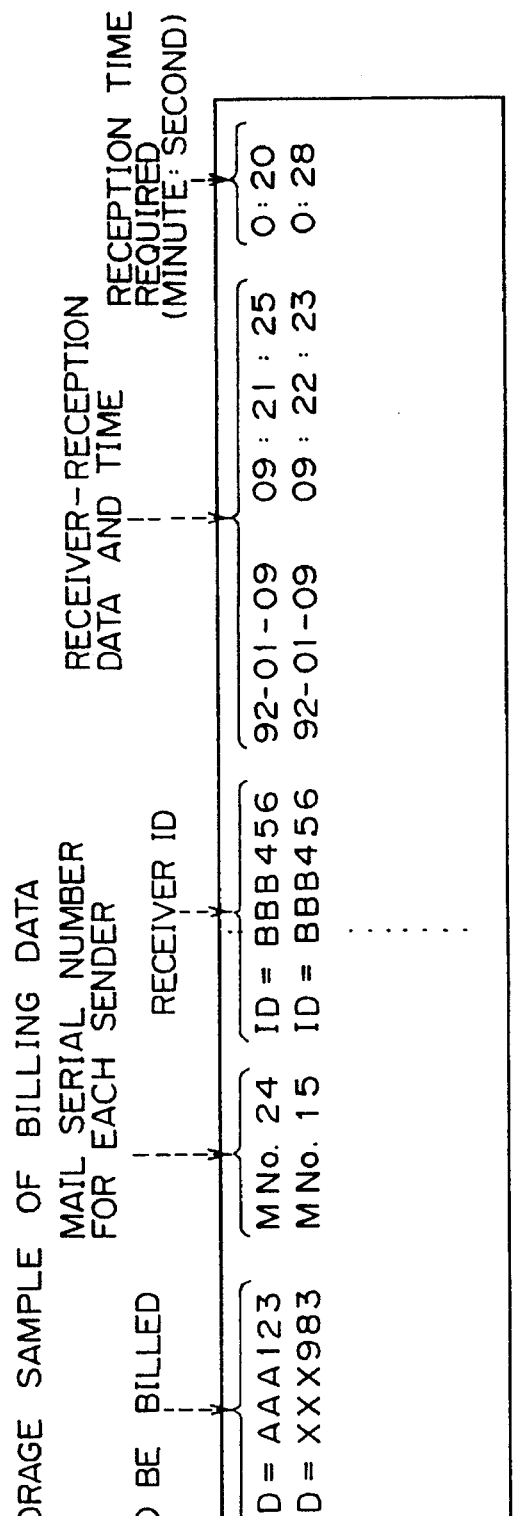

FIGS. 5A and 5B show the system of counting the fee when the electronic mail 2 is sent. FIG. 5A is a time chart showing the transmission of electronic mail.

The transmission of the electronic mail from the electronic mail center 2 to terminal 3a of the receiver 3 is started by the entry of a mail accept command (READ 1, 2) issued by the receiver 3 through terminal 3a. If the command is entered, then the transmission of the designated mail number 1 of the electronic mail 12 is started at time $T_1$ and completed at time $T_2$. The time required for the transmission of the electronic mail is A from time $T_1$ to time $T_2$. After the transmission of this electronic mail, mail number 2 of the electronic mail 12 is transmitted from time $T_2$ to time $T_3$. The transmission time is B. After the transmission of mail number 1 and 2 of the electronic mail 12, the electronic mail center 2 sends a request for a mail acknowledgement to terminal 3a of the receiver 3. In response to the request, the receiver enters through terminal 3a an acknowledgement signal OK if he has received the mail, and NG if he has not received it successfully. The example shown in FIG. 5A indicates an acknowledgement OK entered after the passage of time C following the completion of the reception of electronic mail. Even if the receiver 3 does not send back an acknowledgement signal to the electronic mail center 2 after the passage of a predetermined time following the transmission of the electronic mail, it is desirable that the electronic mail is correctly received if no communications errors are detected.

The electronic mail center 2 calculates the fee for delivering the electronic mail 12 after receiving the acknowledgement from the receiver, and stores it in the storage unit 11 (FIG. 5B). At this time, since the above described fees for delivering mail number 1 and 2 of the electronic mail 12 shown in FIG. 5A are born by the sender 1, the ID to be charged is that of the sender as shown in FIG. 5B. That is, the fee for transmitting electronic mail for the period A is charged to the sender 1 having the sender ID=AAA123, while the fee for transmitting electronic mail for the period B is charged to the sender 1 having the sender ID=XXX983. Additionally, the mail serial number individually assigned for each sender, the receiver ID, the receiver-reception date of the electronic mail 12, the time required for the transmission of the electronic mail 2 between the electronic mail center 2 and the receiver 3 (time required for the reception, that is, A+B in the example shown in FIG. 5A) as a unit to be stored in the storage unit 11 in the electronic mail center 2.

Based on the stored data, the electronic mail center 2 adds the communications fee for sending the electronic mail 2 from the sender to the center 2 to the fee charged according to the time required for the reception of mail shown in FIG. 5B (mail reception fee), and charges the sender 1 for the total communications fee. The center charges the receiver 3 for the amount obtained by subtracting the mail reception fee from the fee charged for the time (A+B+C in the example shown in FIG. 5A) required for a series of operations for receiving the mail.

If the sender 1 sends the electronic mail 12 and specifies the receiver as the fee payer, then the mail reception fee is born by the receiver, or the receiver 3 can reject the reception of the electronic mail. That is, the receiver rejects the payment according to the clearing function in the electronic mail transmission functions generally provided for the electronic mail system.

The method of realizing the sending, receiving, and charging processes for the above described electronic mail 12 is explained by referring to the flowchart.

Figure 6:
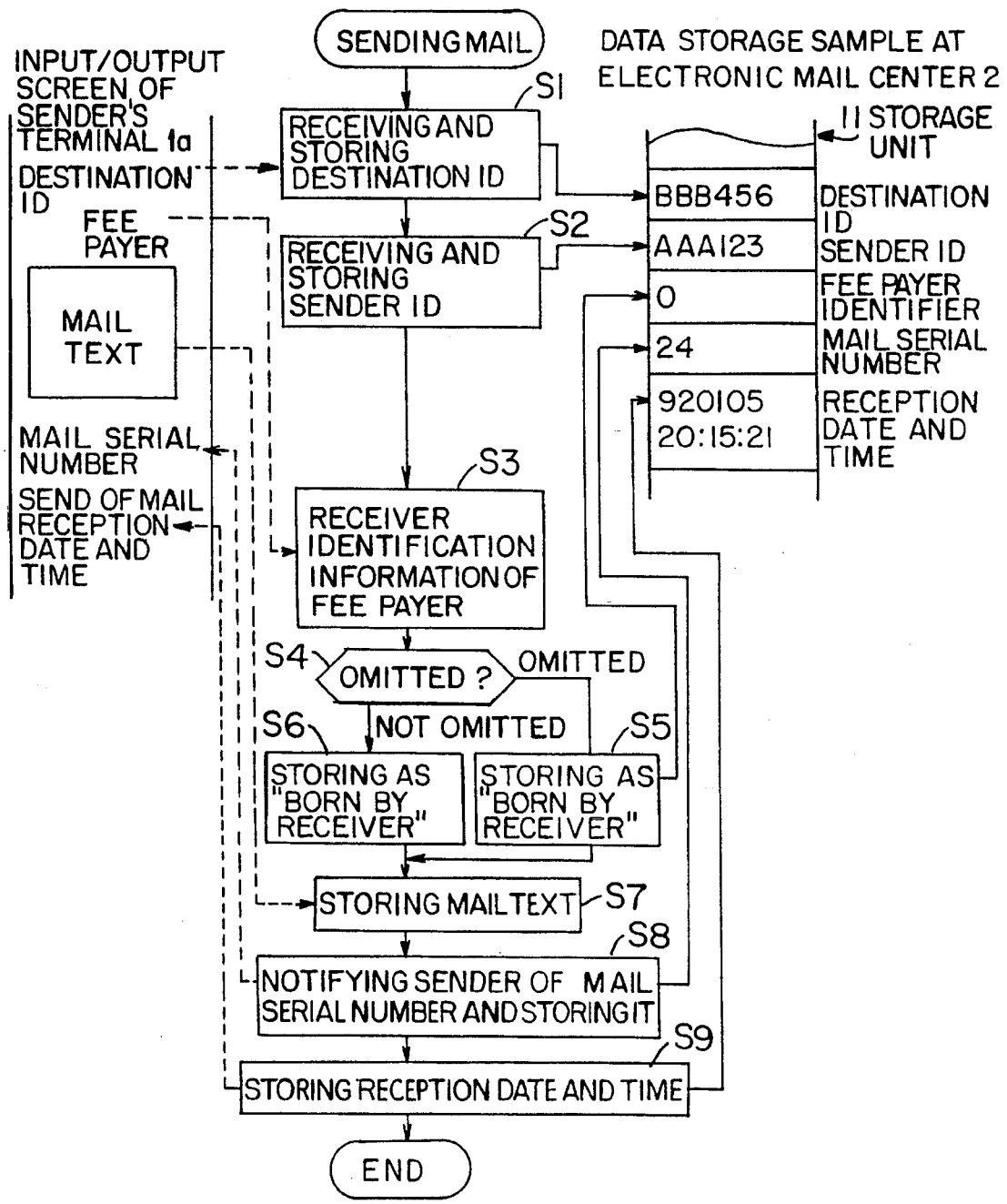
FIG. 6 is a flowchart showing the operation of the electronic mail center when it sends electronic mail.

FIG. 6 is a control flowchart of the electronic mail when it is sent by a sender.

As shown in FIG. 6, the sender 1 sends the electronic mail 12 by sequentially entering the destination ID, the fee payer, and the contents of the electronic mail 12.

When the electronic mail center 2 receives the destination ID (BBB456) from the sender 1, it stores the ID in the storage unit of the center 2 (S1). Then, it stores in the storage unit 11 of the center 2 the sender ID (AAA123) used when the sender accesses the electronic mail center 2 (S2).

Then, the center receives from the sender 1 the identification information on the fee payer (S3). If the sender designates "DEST", then the fee should be born by the receiver. If the identification information on the fee payer is omitted, the fee should be born by the sender. The electronic mail center 2 determines whether or not the fee payer identification information is omitted (S4). If yes (omitted), it stores in its storage unit 11 "O" indicating that the fee is born by the sender (S5). If no ("DEST" is specified), it stores in its storage unit 11 "D" indicating that the fee is born by the destination (56).

Next, the electronic mail center 2 receives the mail text (message contents) 12a from the sender 1 and stores it in its storage unit 11 (S7). Then, the center assigns a serial number to the mail sent by the sender, notifies the sender of the serial number, and stores it in its storage unit (S8). Finally, the center notifies the sender 1 of the reception time (reception date and time) of the mail, and stores it in its storage unit 11 (S9).

After performing the reception process for the electronic mail 12, the electronic mail center 2 sends a message indicating that the receiver 3 has mail received by the electronic mail center when the receiver 3 having the destination ID designated by the electronic mail 12 accesses the electronic mail center 2. In response to this, the receiver 3 sends to the electronic mail center 2 a request for the display of the summary of the mail received by the electronic mail center so as to know its contents.

Figure 7:
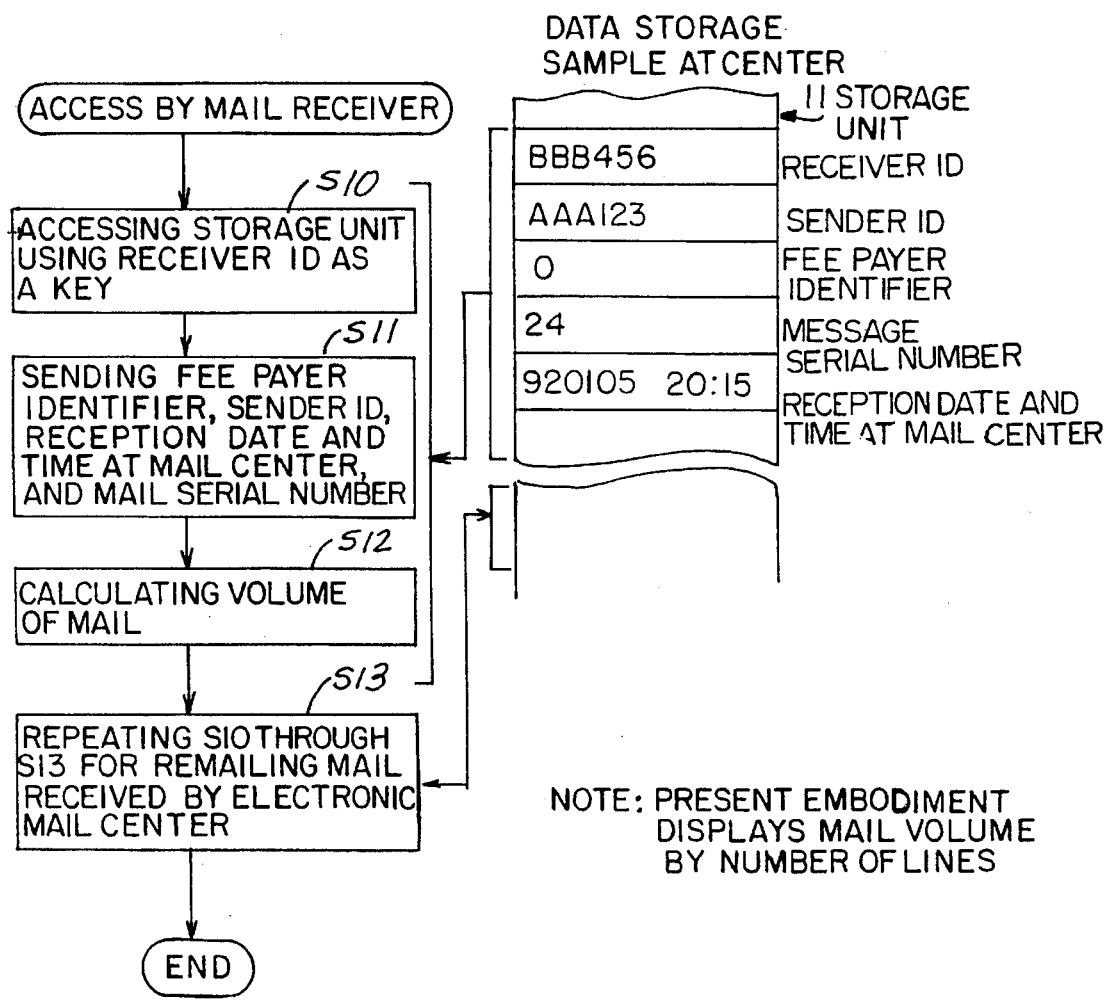
FIG. 7 is a flowchart showing the process of sending the summary information on the mail received by an electronic mail center from the electronic mail center to a receiver of electronic mail.
Figure 8:
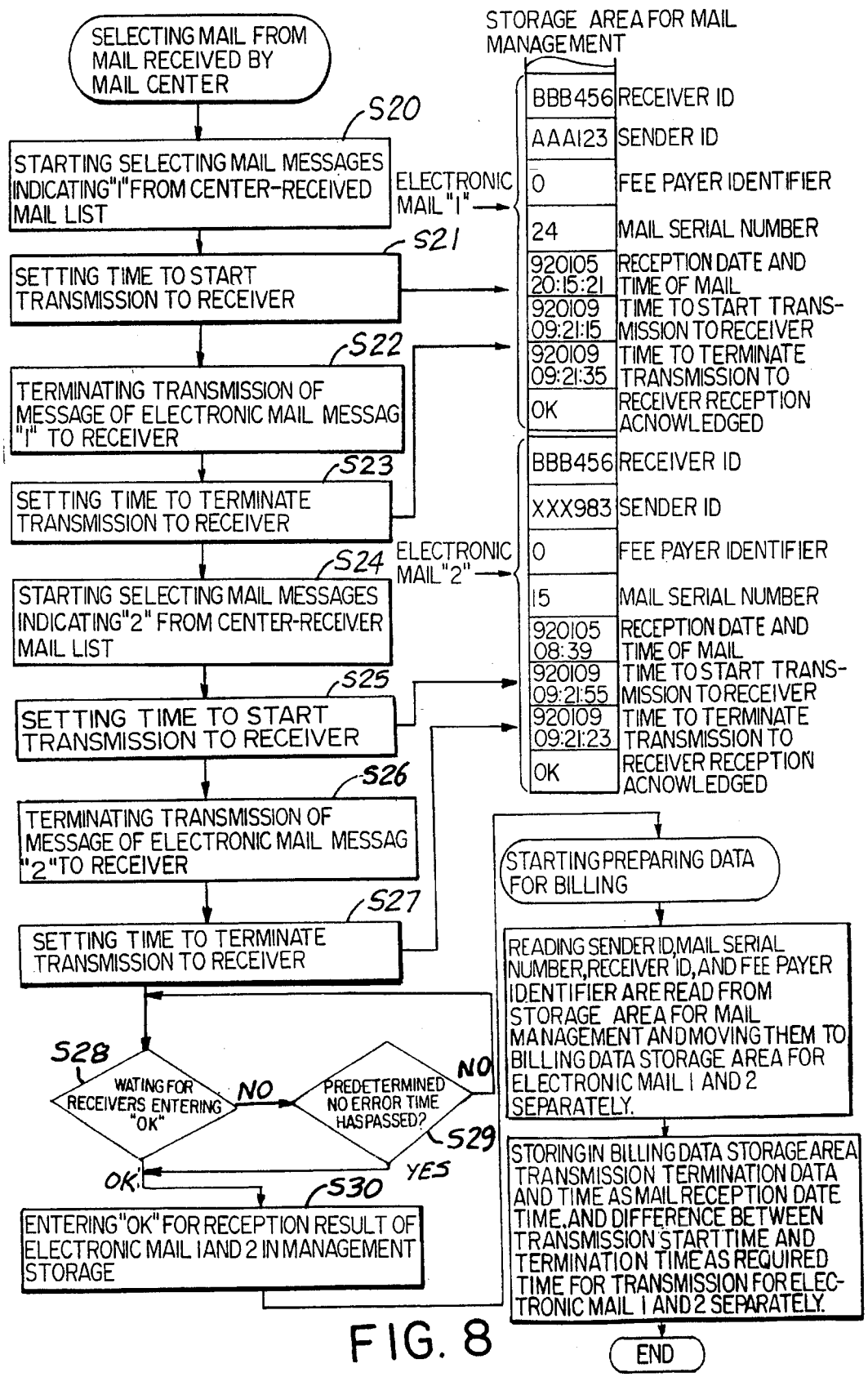
FIG. 8 is a flowchart showing the operation of electronic mail when a mail receiver selects mail to be delivered to the receiver from among the mail received by an electronic mail center.

FIG. 7 is a control flowchart showing the process of displaying the summary of the mail received by the electronic mail center on terminal 3a of the mail receiver 3.

When the mail receiver 3 accesses the electronic mail center 2 through terminal 3a, the electronic mail center 2 retrieves in the storage unit 11, according to the receiver ID (obtained when he accesses the electronic mail center 2) as a key, the data associated with the mail addressed to the receiver 3 and received by the electronic mail center (S10). Then, it reads a fee payer identifier, the sender ID number, the date and time of the mail received at the center, and the mail serial number individually assigned for each sender, and sends them to terminal 3a of the receiver 3 (S11). Then, it calculates and sends the volume of the mail text 12a to terminal 3a of the receiver 3 (S12). In this case, for example, the number of the lines contained in the mail is sent (FIG. 4).

As a result of the above described processes (S10 through S12), the summary of the mail received by the electronic mail center is displayed on terminal 3a of the receiver 3. Likewise, the electronic mail center repeats the above described processes S10 through S12, retrieves the data of all mail stored in the storage unit 11 of the electronic mail center 2 according to the receiver ID as a key, and notifies the receiver 3 of all mail addressed to the receiver 3 and received by the electronic mail center (S13).

The receiver 3 selects the mail to be delivered to him by referring to the information on the mail received by the electronic mail center and displayed on terminal 3a, and enters a command to receive them from the electronic mail center 2, that is, the READ 1,2 command.

The electronic mail center 2 transmits the electronic mail 12 designated by the command. FIG. 7 is a control flowchart showing the transmission of the electronic mail from the electronic mail center 2 to the receiver 3.

When receiving the command READ 1,2, the electronic mail center 2 retrieves in the storage unit 11 the contents of the electronic mail 12 displayed as the first electronic mail on the mail summary display screen of terminal 3a of the receiver 3, and starts the transmission (S20). At this time, the start time of the transmission of electronic mail 12 to the receiver 3 is detected, and added immediately after the electronic mail 12 in its storage position in the mail management storage area of the storage unit 11 in the center 2 (21). Then, the electronic mail 12 is transmitted completely, and the transmission process is terminated (S22). Next, when the mail 12 is transmitted completely, and the transmission process is terminated (S22), the transmission completion time is detected, and added immediately after the electronic mail 12 in its storage position in the mail management storage area of the storage unit 11 in the center 2 (23).

Likewise, as in the process for the first electronic mail 12, the transmission of the second electronic mail 12 designated by the command READ 1,2 is performed (S24 through S27).

Thus, the transmission of the electronic mail accepted by the receiver 3 is completed.

After the transmission, the electronic mail center 2 enters the state of waiting for an acknowledge "OK" from the receiver 3 (S28). Unless the acknowledge "OK" is entered (NO), it is determined whether or not a predetermined time has passed within the fixed time intervals (S29). The acknowledgement "OK" from the receiver 3 is waited until a fixed time has passed (S28). If the acknowledgement "OK" is received (YES in S28), a billing process described later is started. If a fixed time has passed (YES in S29) without receiving the acknowledgement "OK", it is determined that the receiver 3 has sent the acknowledgement "OK" and the billing process is started. Before the billing process, the electronic mail center 2 writes the information that the acknowledgement is received (mail reception permitted) after the storage position of the electronic mail 12 (S30)

After the process (S30), the data are prepared for the billing process.

That is, the sender ID (AAA123, XXX983), mail serial number (24, 15), and receiver ID (BBB456, BBB456) are read from the above described mail management storage area individually for each of the first and second electronic mail 12, and are stored in a storage area for the billing process (S31). Furthermore, the transmission start time (920109 09'21:15, 920109 09'21:35) and the transmission end time (920109 09'21:55, 920109 09'22:23) are read individually for each of the first and second electronic mail. They are stored in the storage area for the billing process (S32) with the transmission end time set as the mail reception date and time, and with the difference between the transmission start time and the transmission end time set as the required transmission time (0:20, 0:28).

According to the above described processes, the billing data storage area in the storage unit 11 of the electronic mail center 2 stores the data on each of the electronic mail 1 and 2 as shown in FIG. 9.

The above described procedure shows how to receive the electronic mail 12 from the electronic mail center 2.

Figure 10:
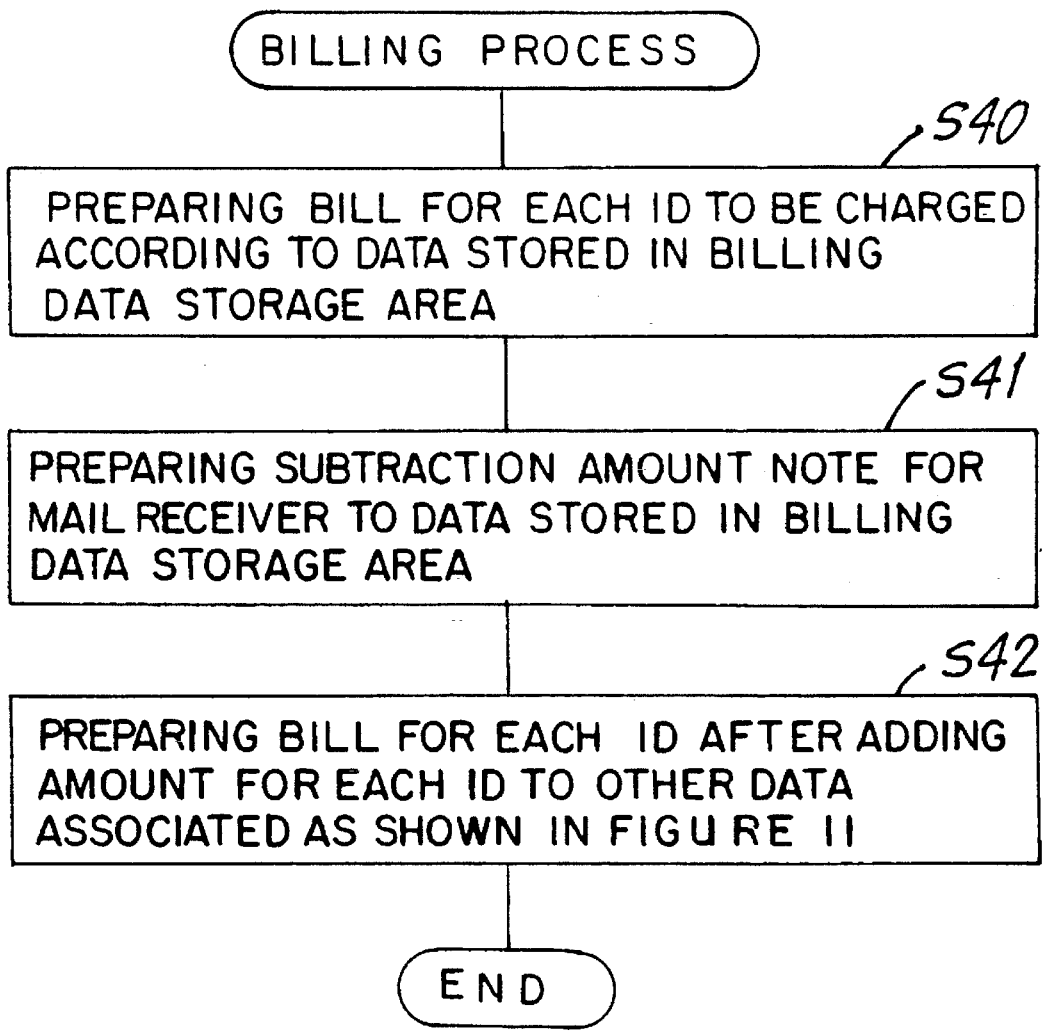
FIG. 10 is a flowchart showing the process of preparing a bill by an electronic mail center.

Next, the flow of a bill generating process performed by the electronic mail center 2 is explained below. FIG. 10 is a flowchart for explaining the operation of the bill generating process.

In this process, the electronic mail center 2 accesses the billing data storage area (shown in FIG. 9) in its storage unit 11, and issues a bill for each sender ID of the sender 1 (to be charged) of the electronic mail 12 (S40). In the example shown in FIG. 9, bills addressed to the sender 1 having the sender ID are prepared for AAA123 and XXX983. As a result, the billing data shown in FIGS. 11A and 11B are generated.

Then, after the sender 1 designates that the transmission fee is born by the sender, generated is a bill for subtracting the fee for the communication between the electronic mail center 2 and the receiver 3 the electronic mail received by the receiver 3 (S41). As a result, the billing data shown in FIG. 11C are prepared. That is, since the fee for the transmission from the electronic center 2 to the receiver 3 is born by the sender, the amount of the bill is subtracted.

Finally, the fees for transmitting the mail from the sender 1 to the electronic mail center 2 and for the receiver's receiving the mail received by the electronic mail center are all added to the above described communications fee born by the receiver 3 and associated with the reception of mail (FIG. 11A through 11C) between the electronic mail center 2 and the receiver 3. Then, the bills for the electronic mail are prepared individually for each ID (sender 1 or receiver 3) (S42).

Thus, the electronic mail communications fee for the transmission between the sender 1 and the receiver 3 is born by the payer designated by the sender 1 for the fee for the communication between the electronic mail center 2 and the receiver 3, and therefore, can be optionally charged to the sender 1 or the receiver 3.

FIGS. 11A through 11C show examples of the calculation for the transmission fees of the electronic mail on the basis of 10 yen per minute.

As described above, the present invention allows the sender to designate the communications fee between the electronic center 2 and the receiver 3 as charged to the sender 1. Therefore, the receiver 3 can accept or reject the reception of the electronic mail 12 depending on the designation of the fee payer. Accordingly, the receiver can be free of an undesirable charge for long-time electronic mail as long as the communications fee of the electronic mail 12 between the electronic mail center and the receiver is born by the sender. Furthermore, if the electronic mail 12 is direct mail, the sender 3 can accept it without hesitation if its reception fee is born by the sender. Additionally, according to the present invention, the electronic mail center 2 can collectively receive messages from a number of senders, and separately charge each of the senders the communications fee. Since it is also possible to notify the sender 1 of the reception date and time at the receiver 3, the sender 1 can confirm the reception of the electronic mail 12 sent by him.

What is claimed is:

1. An electronic mail system for storing, in an electronic mail center, electronic mail sent by a sender, transmitting said electronic mail from said electronic mail center to a receiver if said receiver issues a request for a reception of said electronic mail stored in said electronic mail center, said system comprising:

fee payer designating means, for receiving from said sender, an information which designates whether said sender or said receiver is a fee payer, mail summary information sending means for sending information containing a name of said sender and a designation of a reception fee payer of said electronic mail addressed to said receiver when said receiver inquires an information about said electronic mail addressed to him, billing means for charging a fee payer, said billing means charging said sender a reception fee for transmitting said electronic mail if said sender designates himself as a communications fee payer using said fee payer designating means, and charging said receiver the reception fee for transmitting said electronic mail if said sender designates said receiver as a communications fee payer using said fee payer designating means, in response to an acceptance from said receiver, and electronic mail delivery designating means, provided at said receiver, for designating electronic mail to be delivered to said receiver from among said electronic mail addressed to said receiver.

2. The electronic mail system according to claim 1, wherein said mail summary information sending means sends an information about a time of sending of said electronic mail.

3. The electronic mail system according to claim 1, wherein said mail summary information sending means sends an information about a volume of said electronic mail.

4. The electronic mail system according to claim 1, wherein said billing means for charging a fee payer designated by said sender of said electronic mail through said fee payer designating means for the reception fee of said electronic mail when said receiver receives plural pieces of said electronic mail sent by different senders through said electronic mail delivery designating means.

5. The electronic mail system according to claim 1, wherein said billing means notifies said sender in addition to the reception fee of a reception time of said electronic mail, a fee of which is born by said sender, received by said receiver from said electronic mail center through said electronic mail delivery designating means.

6. The electronic mail system according to claim 2, wherein said mail summary information sending means sends an information about a volume of said electronic mail.

7. The electronic mail system according to claim 2, wherein said billing means for charging a fee payer designated by said sender of said electronic mail through said fee payer designating means for the reception fee of said electronic mail when said receiver receives plural pieces of said electronic mail sent by different senders through said electronic mail delivery designating means.

8. The electronic mail system according to claim 2, wherein said billing means notifies said sender in addition to the reception fee of a reception time of said electronic mail, a fee of which is born by said sender, received by said receiver from said electronic mail center through said electronic mail delivery designating means.

9. The electronic mail system according to claim 3, wherein said billing means for charging a fee payer designated by said sender of said electronic mail through said fee payer designating means for the reception fee of said electronic mail when said receiver receives plural pieces of said electronic mail sent by different senders through said electronic mail delivery designating means.

10. The electronic mail system according to claim 3, wherein said billing means notifies said sender in addition to the reception fee of a reception time of said electronic mail, a fee of which is born by said sender, received by said receiver from said electronic mail center through said electronic mail delivery designating means.

11. The electronic mail system according to claim 4, wherein said billing means notifies said sender in addition to the reception fee of a reception time of said electronic mail, a fee of which is born by said sender, received by said receiver from said electronic mail center through said electronic mail delivery designating means.

12. The electronic mail system according to claim 11, wherein said billing means notifies said sender of time taken for reception of said electronic mail.

13. The electronic mail system according to claim 1, and further comprising mail summary displaying means, provided at said receiver, for displaying the information sent from said mail summary information sending means about said electronic mail addressed to said receiver.

* * * * *